(12) United States Patent
Yang

(10) Patent No.: US 6,241,292 B1
(45) Date of Patent: Jun. 5, 2001

(54) COUPLING DEVICE FOR METAL PIPES WITH INNOVATIVE PACKING STRUCTURE

(76) Inventor: Che-hsiung Yang, No. 4, Lane 781, Jen-Hua Rd, Ta-Li City, Taichung Hsien (TW)

( * ) Notice: Subject to any disclaimer, the term of this patent is extended or adjusted under 35 U.S.C. 154(b) by 0 days.

(21) Appl. No.: 09/233,332

(22) Filed: Jan. 20, 1999

(51) Int. Cl.[7] ................................................... F16L 17/00
(52) U.S. Cl. .......................................... 285/340; 285/323
(58) Field of Search ................................. 285/340, 322, 285/323, 913

(56) References Cited

U.S. PATENT DOCUMENTS

| 5,378,027 | * | 1/1995 | Gehring | 285/322 |
| 5,405,172 | * | 4/1995 | Mullen | 285/323 X |
| 5,496,076 | * | 3/1996 | Lin | 285/340 X |

FOREIGN PATENT DOCUMENTS

1335121 * 7/1963 (FR) ..................................... 285/340

\* cited by examiner

*Primary Examiner*—Teri Pham Luu
(74) *Attorney, Agent, or Firm*—Jacobson, Price, Holman & Stern, PLLC

(57) ABSTRACT

A coupling device for metal pipes includes a cup-joint, a packing bushing, a padding bushing and a bridging connector. The cup-joint holds and confines in its confining face the packing bushing and the padding bushing to yield a central holding hole for accommodating metal pipe. When the set of cup-joint, packing bushing and padding bushing is screwed to the threaded head of the bridging connector, the guiding face of the cup-joint squeezes the converging ending of the padding bushing to yield an excellent sealing effect to the metal pipe, while in turn the padding bushing pushes and squeezes the fortifiers against the confining face and the metal pipe to yield a clasping and sealing effect against leakage inside the couple device.

1 Claim, 5 Drawing Sheets

COUPLING DEVICE FOR METAL PIPES WITH INNOVATIVE PACKING STRUCTURE

BACKGROUND OF THE INVENTION

1. Field of the Invention

The present invention relates to a Coupling Device for metal pipes with innovative packing structure.

2. Discussion of the Conventional Art in the Similar Field

Drawings (4) and (5) are enclosed hereby for explaining the conventional coupling device with conventional packing structure.

A conventional coupling device (FIG. 4) for metal pipes comprises a Cup-joint(A), a Packing Bushing(B), a Padding Bushing(C) and a Bridging Connector(D). The Cup-joint(A) featuring a Side-ring(A1) at one end yields a Holding Hole(A11) and a Confining Face(A12) on the inner face inside the Cup-joint itself, wherein the Packing Bushing(B) and the Padding Bushing(C) are held and confined. The Packing Bushing(B) featuring a ring of Packing Fortifiers (B1) on one inner edge is coupled and confined in the Confining Face(A12) of the Cup-joint(A) and in turn the Padding Bushing(C) featuring a Converging Ending(C1) is coupled and confined inside the Packing Bushing(B), such that the Fortifier Ring(B1) is coupled to the Side-ring(A1) of the Cup-joint and the Converging Ending(C1) is coupled to the Guiding Face(D1) of the Bridging Connector(D). When (A), (B), (C) and (D) four parts are fixed together, the conventional Coupling Device is completed to yield a Holding Hole(A11) for holding two ends of two separate metal pipes together.

The feature of the conventional Coupling Device is that, when the Cup-joint(A) is screwed to the Bridging Connector (D), the Converging Ending(C1) will get into the Guiding Face(D1) and thus seals up the gap in between the connector (D) and the Metal Pipe(E). On the other hand, the whole Padding Bushing(C) is pushed by the Guiding Face (D1) against the Fortifiers(B1) of the Packing Bushing. As a result, the indentation structure of the Fortifier Ring are forced by the Padding Bushing(C) to change form and clasp the metal pipe tightly. The sealing effect of the Padding Bushing and the clasping force of the Fortifiers will increase as the force to screw the Cup-joint to the Bridging Connector increases. In practice, since the screwing force is only conducted by the Confining Face(A12) of the Cup-joint(A), it requires a great force to push the Converging Ending in and change the shape of the Fortifier-indentation. The conventional coupling device is obvious in a crude and unrefined stage. It requires innovation.

SUMMARY OF THE INVENTION

In view of the insufficiency of the conventional coupling device, the present invention is directed to a coupling device for metal pipes with innovative packing structure which ensures excellent sealing and clasping effect between the coupling device and the metal pipes.

To achieve the innovation, the inventor of prevent invention has designed a new set of coupling device (FIG. 1) which comprises a Cup-joint, an innovative Packing Bushing, an innovative Padding Bushing and a Bridging Connector.

The Cup-joint featuring a Side-ring at one end yields a Holding Hole and a Confining Face on the inner face of the Cup-joint itself, wherein the Packing Bushing and the Padding Bushing are held and confined. The innovative Packing Bushing featuring an indented ring of Packing Fortifiers round one of the two rims is coupled and confined in the Confining Face of the Cup-joint And in turn the innovative Padding Bushing featuring a Converging Ending at one rim and an indented ring of fortifiers at another is coupled and confined inside the Packing Bushing, such that the indented Fortifier Ring of the Packing Bushing is intimately matched to the indented Fortifier-ring of the Padding Bushing. That is, the Fortifiers of one Busing are precisely configured to go into the recesses of the other, while the Converging Ending of the Padding Bushing matches to the Guiding Face of the Bridging Connector. When the Cup-joint, the Packing Bushing, the Padding Bushing and the Bridging Connector are fixed together, an innovative Coupling Device is set up to yield a Holding Hole centrally for holding two ends of two separate metal pipes together.

The feature of this innovative Coupling Device is that, the indentation ring of the Packing Busing and Padding Busing are matched together to be jointly confined to the Confining Face of the Cup-joint. When the Cup-joint is screwed to the Bridging Connector, the Converging Ending of the Padding Bushing will get into the Guiding Face of the Bridging Connector and thus seal up the gaps in between the connector and the Metal Pipe. On the other hand, the whole Packing Bushing and Padding Bushing combination is concurrently pushed and squeezed by the Guiding Face against the Side Ring and Confining Face of the Cup-joint. As a result, the Fortifiers of the two Bushings are forced and squeezed by each other. When the Cup-joint is screwed further to the Bridging Connector, the Fortifiers are responsively deformed to fill up all the gaps in between the metal pipe and the Fortifier Ring. Subsequently, the Fortifier Combination not only clasps the pipe but also seals up the leakage. In practice, since the screwing force is effectively conducted by the Confining Face of the Cup joint to the whole indentation combination, it requires only a few turns of the Cup-joint to seal up the leakage.

Summarily, the invention has achieved the following innovation:

1. The Padding Bushing features a Fortifier structure to match with the Fortifier structure of the Packing Bushing.
2. The Fortifier combination of the two Bushings copes intimately with the metal pipe to perform a double-sealing function.
3. The Fortifier combination of the two Bushings requires less force to produce higher sealing efficiency.

BRIEF DESCRIPTION OF THE DRAWINGS

The drawings enclosed hereby will illustrate the embodiments of the resent invention which serves to exemplify the various advantages hereof.

DETAILED DESCRIPTION OF THE PREFERRED EMBODIMENTS

Figure 1:
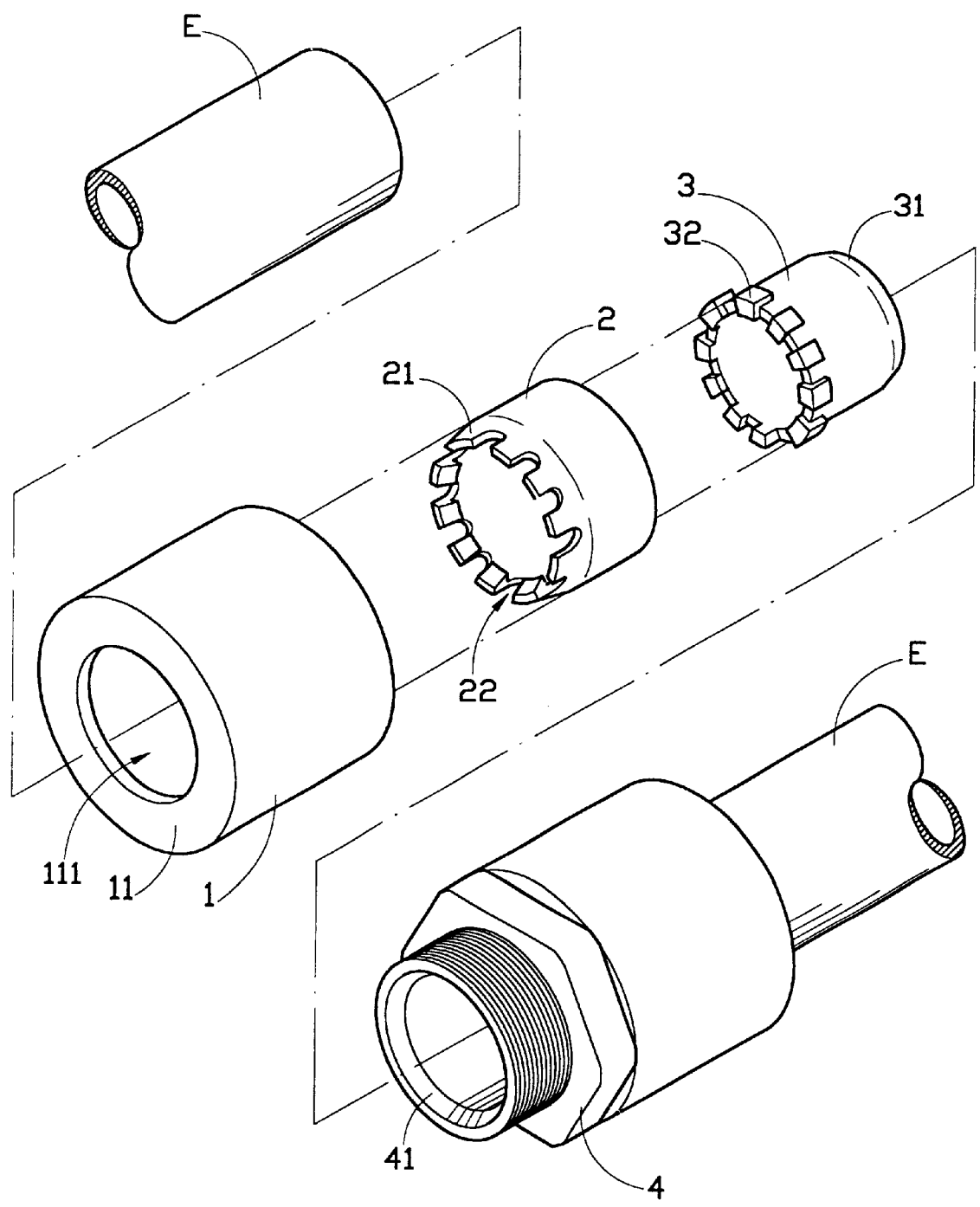
FIG. 1: Drawing of Complete Set of Coupling Device for Metal Pipes
Figure 2:
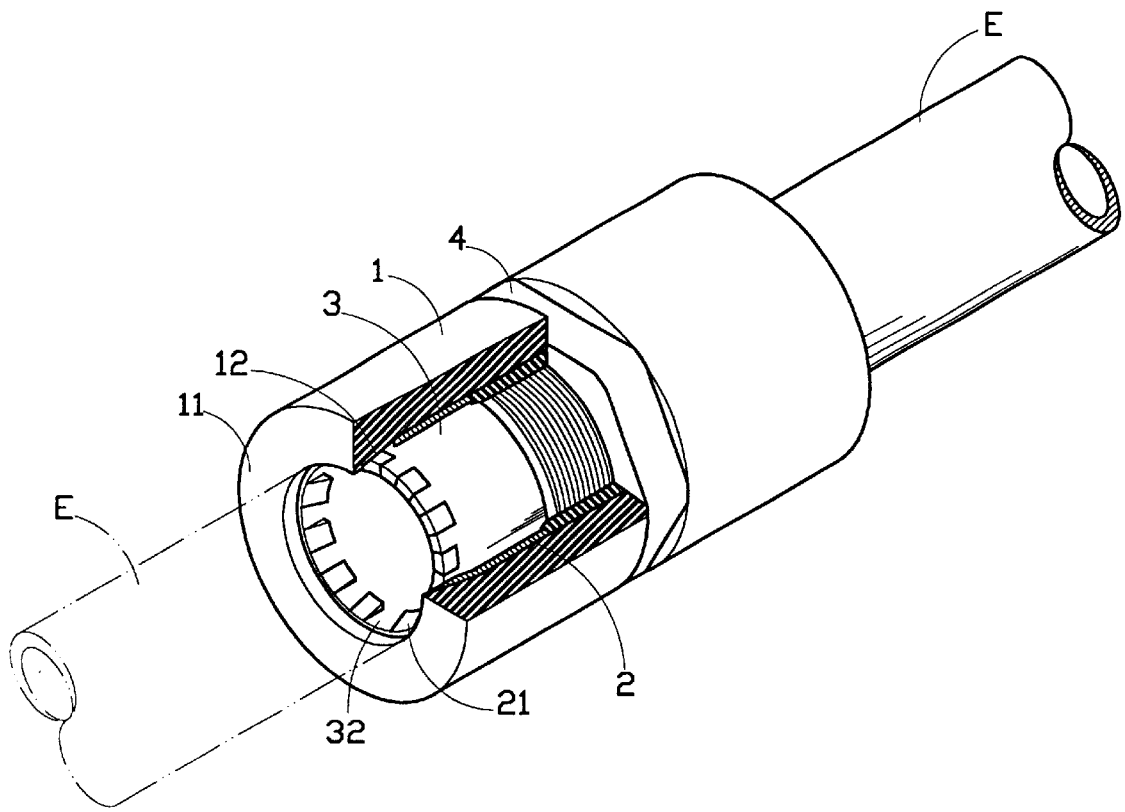
FIG. 2: Drawing of Longitudinal Section of Coupling Device
Figure 3:
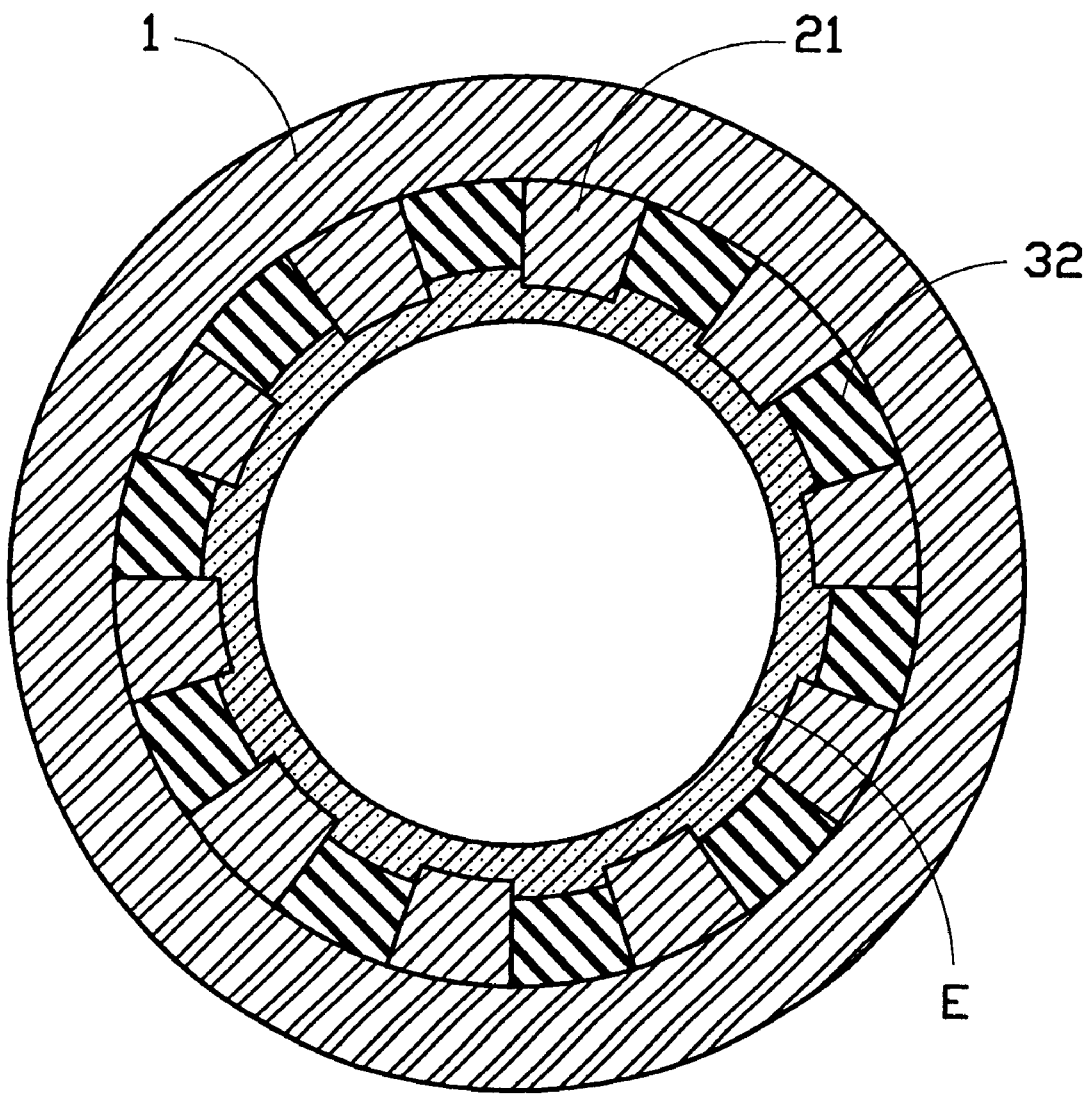
FIG. 3: Drawing of Cross Section of Coupling Device
Figure 4:
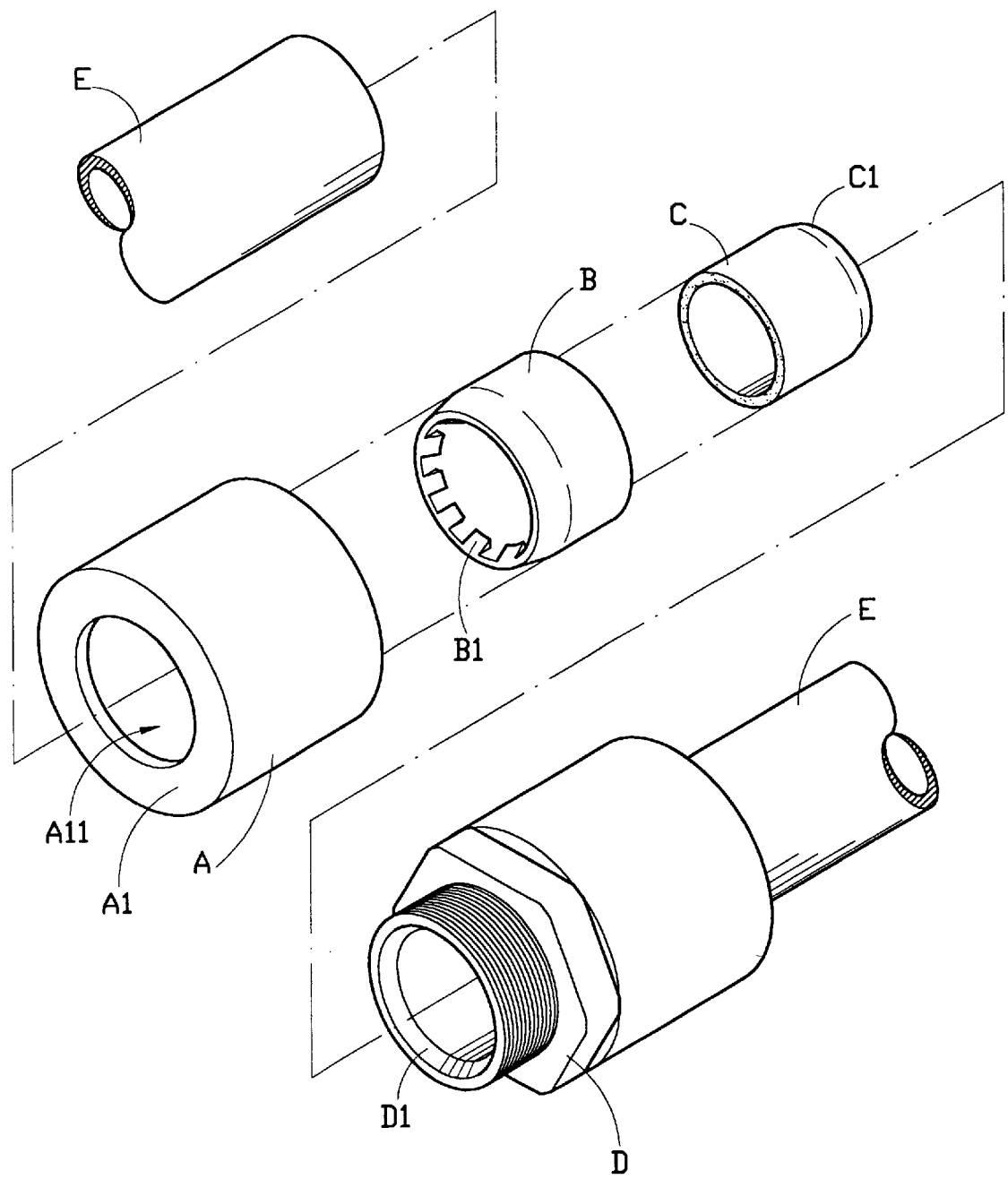
FIG. 4: Drawing of a Conventional Coupling Device
Figure 5:
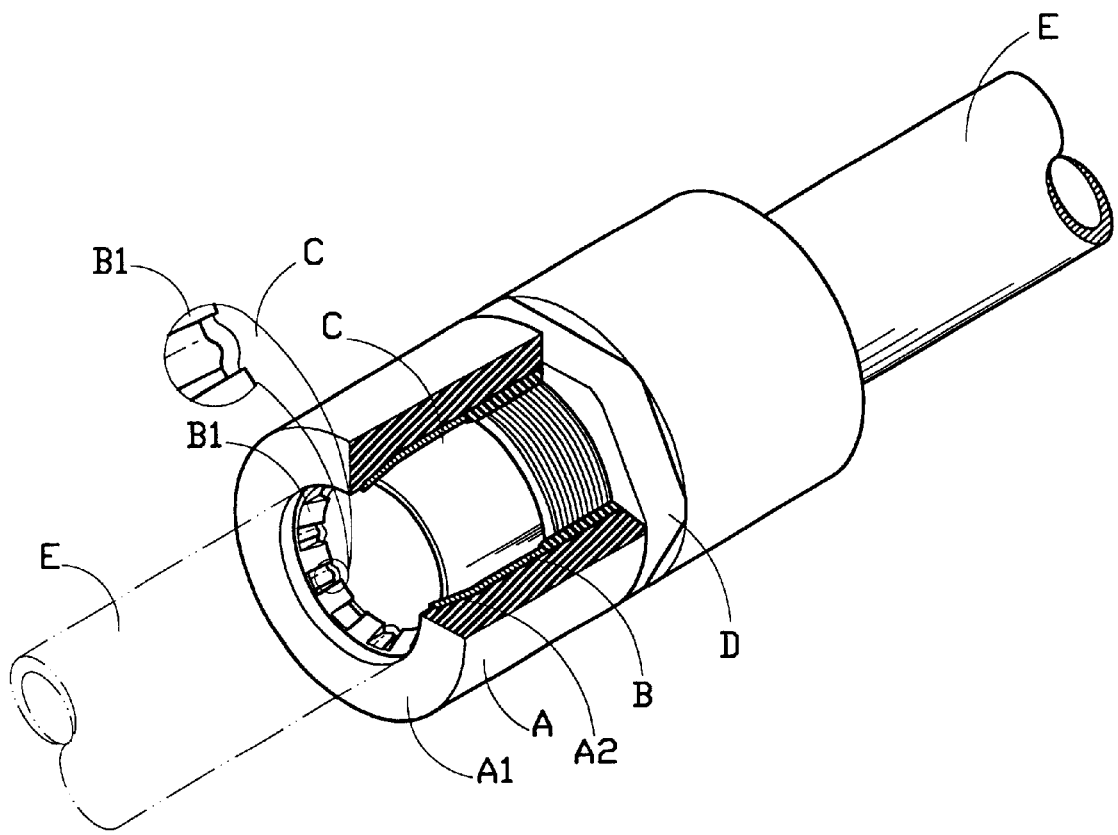
FIG. 5: Explanatory Drawing of a Conventional Coupling Device

From FIG. 1 to FIG. 3, the drawings show embodiments constituting a coupling device for metal pipes:

1. The Cup-joint

The Cup-joint(1),as illustrated in FIG. 1, featuring a Side-ring(11) at one end bears a Holding Hole(111) and a Confining Face(12) on the inner face of-the Cup-joint itself, wherein the Packing Bushing and the Padding Bushing are to be held and confined.

2. The Packing Bushing

The innovative Packing Bushing(2), as illustrated in FIG. 1, featuring an indented ring of Packing Fortifiers(21) and Recesses(22) round one of the two rims is to be coupled and confined in the Confining Face(12) of the Cup-joint(1), such that the Fortifier Ring is aligned to the Side Ring(11) of the Cup-joint(1).

3. The Padding Bushing

The innovative Padding Bushing(3), as illustrated in FIG. 1, featuring a Converging Ending(31) at one rim and an indented ring of fortifiers(32) at another is to be coupled and confined inside the Packing Bushing(2), such that the indented Fortifier Ring of the Packing Bushing(3) is intimately matched to the indented Fortifier-ring of the Padding Bushing(2). That is, the Fortifiers of the Padding Busing(3) are precisely configured to go into the recesses(22) of the Packing Busing(2), while the Converging Ending(31) of the Padding Bushing(3) matches to the Guiding Face(41) of the Bridging Connector(4).

4. The Bridging Connector

The Bridging Connector(4), as illustrated in FIG. 1, featuring a Guiding Face(41) and a threaded heading accommodates the end portion of Metal Pipe(E).

When the Cup-joint(1), the Packing Bushing(2), the Padding Bushing(3) and the Bridging Connector(4) are fixed together, an innovative Coupling Device is set up to yield a Holding Hole centrally for holding two ends of two separate metal pipes together. FIG. 2 illustrates the setting up of the coupling device with two metal pipes held inside the device itself.

The feature of this innovative Coupling Device is that, the indentation ring of the Packing Busing(2) and Padding Busing(3) are, matched together to be jointly confined to the Confining Face(12) of the Cup-joint(1). When the Cup-joint (1) is screwed to the Bridging Connector(4), the Converging Ending(31) of the Padding Bushing(3) will get into the Guiding Face(41) of the Bridging Connector(4) and thus seal up the gaps in between the connector(4) and the Metal Pipe(E). On the other hand, the whole Packing Bushing(2) and Padding Bushing(3) combination is concurrently pushed and squeezed by the Guiding Face(41) against the Side Ring(11) and Confining Face(12) of the Cup-joint(1). As a result, the Fortifiers (21) and (32) of the two Bushings are forced and squeezed by each other. When the Cup-joint(1) is screwed further to the Bridging Connector(4), the Fortifiers are responsively deformed to fill up all the gaps in between the metal pipe(E) and the Fortifier Ring. Subsequently, the Fortifier Combination not only clasps the pipe(E) but also seals up the leakage. In practice, since the screwing force is effectively conducted by the Confining Face(12) of the Cup-joint(1) to the whole indentation combination, it requires only a few turns of the Cup-joint(1) to seal up the leakage. FIG. 3 illustrates how the fortifiers of the two bushings are matched squeezed to each other to produce a clasping and sealing effect to the metal pipe

What is claimed is:

1. A coupling device for metal pipes with a packing structure, said coupling device comprising:

a cup-joint featuring a side-ring at one end and a confining face on an inner face of the side-ring;

a packing bushing having two rims featuring an indented ring of packing fortifiers around one of the two rims;

a padding bushing having two rims featuring a converging ending at one rim and an indented ring of fortifiers at the other rim;

a bridging connector featuring a threaded heading at one end and a guiding face inside the bridging connector so that when said cup joint is secured to said bridging connector the indented ring of fortifiers of said packing bushing holds the indented ring of fortifiers of the padding bushing with the two said bushings coupled together and the guiding face of the bridging connector pushes the converging face of the padding bushing and the padding bushing in turn squeezes the fortifier ring of the packing bushing against the confirming face of the side ring of the cup-joint to clasp and seal a metal pipe inserted into the cup-joint.

* * * * *